United States Patent
Mullaney

(10) Patent No.: US 8,944,249 B1
(45) Date of Patent: Feb. 3, 2015

(54) REFUSE CONTAINER WITH MECHANICAL WEIGHT INDICATOR AND DANGER ALERTING

(71) Applicant: Gregory Mullaney, Cockeysville, MD (US)

(72) Inventor: Gregory Mullaney, Cockeysville, MD (US)

( * ) Notice: Subject to any disclaimer, the term of this patent is extended or adjusted under 35 U.S.C. 154(b) by 0 days.

(21) Appl. No.: 14/145,480

(22) Filed: Dec. 31, 2013

(51) Int. Cl.
  *G01G 19/52* (2006.01)
  *B65F 1/14* (2006.01)
  *G01G 23/01* (2006.01)

(52) U.S. Cl.
  CPC ...... *B65F 1/14* (2013.01); *G01G 23/01* (2013.01); *Y10S 220/908* (2013.01)
  USPC .......... 206/459.1; 220/908; 177/144

(58) Field of Classification Search
  CPC .......................................... B65F 1/14
  USPC ............ 206/459.1; 177/186, 238, 244, 245, 177/242, 241, 132, 144, 160, 135, 240; 220/908
  See application file for complete search history.

(56) References Cited

U.S. PATENT DOCUMENTS

| | | | |
|---|---|---|---|
| 1,852,973 A | 4/1932 | Justus | |
| 2,054,184 A | 9/1936 | Von Pein | |
| 2,069,499 A * | 2/1937 | Marin et al. | 177/238 |
| 2,073,912 A | 3/1937 | Walker | |
| 2,126,377 A | 8/1938 | Fear et al. | |
| 2,300,282 A | 10/1942 | Eash | |
| 2,475,684 A | 7/1949 | Weckerly | |
| 4,164,178 A | 8/1979 | Baumann et al. | |
| 4,407,191 A | 10/1983 | Brenner | |
| 5,641,947 A | 6/1997 | Riddle, Jr. | |
| 5,740,909 A * | 4/1998 | Nazare et al. | 206/366 |
| 7,151,231 B2 | 12/2006 | Kamakau | |
| 7,161,097 B1 | 1/2007 | Gorgone | |
| 8,716,610 B2 * | 5/2014 | Zyman Beer et al. | 177/148 |
| 2003/0047178 A1 * | 3/2003 | Barth et al. | 126/41 R |
| 2005/0217903 A1 | 10/2005 | Roberts et al. | |
| 2006/0054364 A1 | 3/2006 | Kamakau | |
| 2007/0056779 A1 * | 3/2007 | Laniado et al. | 177/245 |

* cited by examiner

*Primary Examiner* — Mickey Yu
*Assistant Examiner* — Allan Stevens
(74) *Attorney, Agent, or Firm* — David C. Isaacson; Fitzgerald & Isaacson, LLP

(57) ABSTRACT

A refuse container provides an indication of the weight of the refuse stored therein to a refuse collector to indicate whether the weight is safe to handle or requires extra caution. The refuse container includes a body into which one or more springs is places. A platform is placed on the one or more springs. A weight indicator is attached to the platform. The weight indicator has marking to distinguish a plurality of weight indicator regions. A window allows the weight indicator to be seen. As the platform moves up and down in response to the weight of the refuse thereon, certain of the weight indicator regions of the weight indicator will be viewable in the window to thereby indicate how safe the refuse in the refuse container is to handle or whether additional refuse can be added to the refuse container.

12 Claims, 6 Drawing Sheets

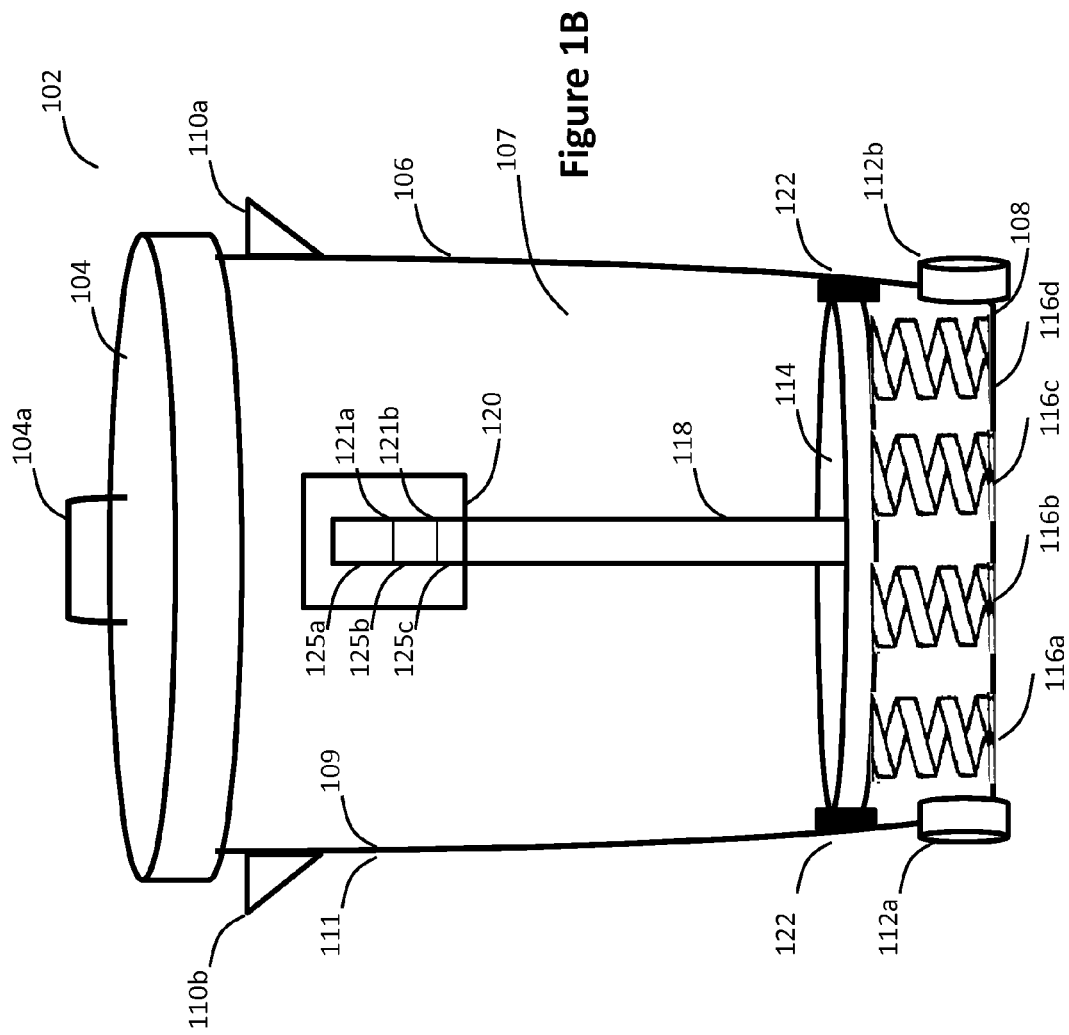

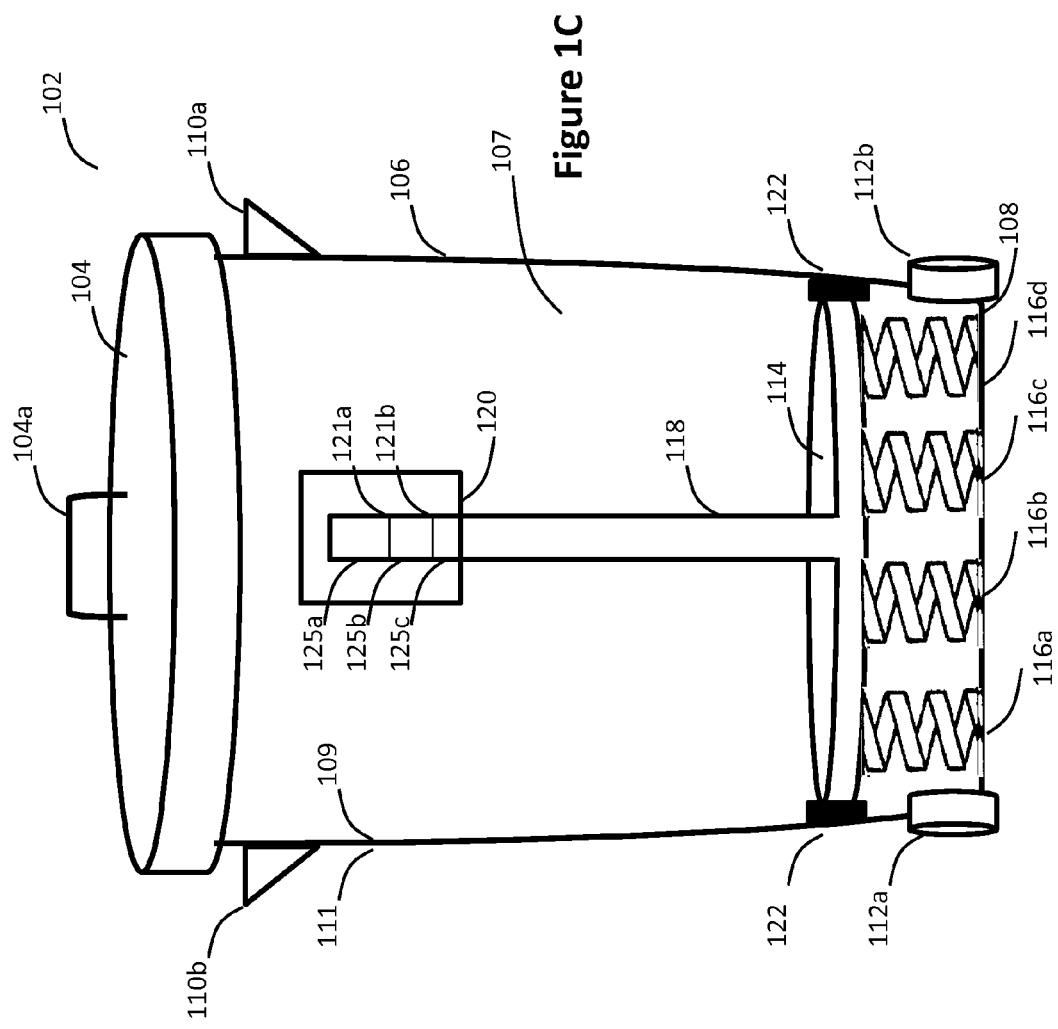

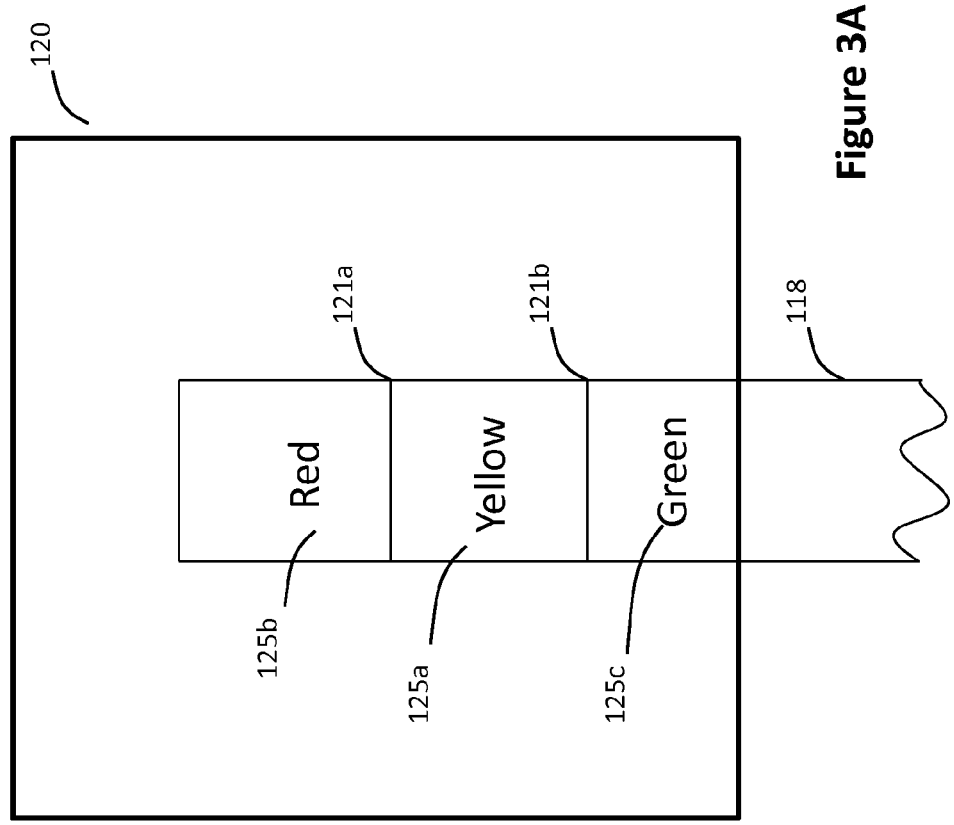

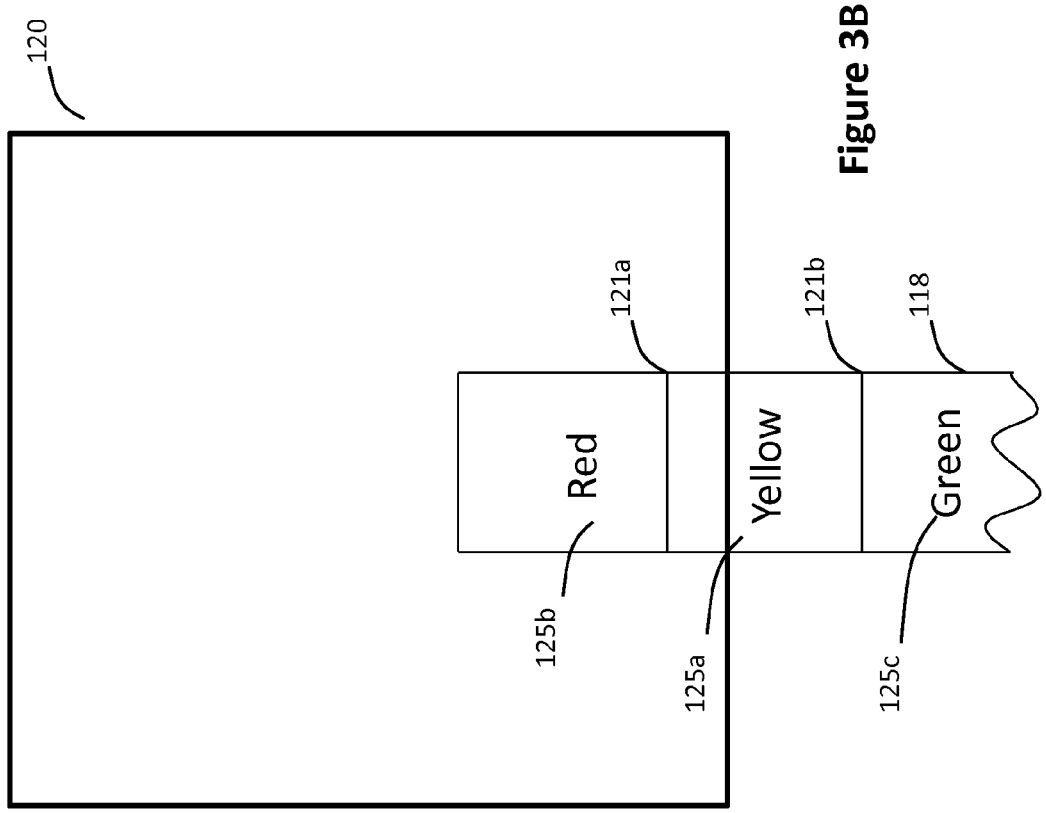

REFUSE CONTAINER WITH MECHANICAL WEIGHT INDICATOR AND DANGER ALERTING

BACKGROUND

1. Field of the Invention

Embodiments of the present invention relate generally to health and safety. More specifically, embodiments of the present invention relate to a refuse container that provides a mechanical indication of dangerous weight conditions of refuse in the refuse container.

2. Background of the Invention

Those involved on the frontlines of refuse collection have a physically demanding job. Moving and lifting heavily loaded garbage cans or other refuse containers is difficult and demanding work. Typically, there is no way for a refuse collector to know how heavy a particular garbage can is prior to moving or picking it up. How full a particular refuse container is may provide little information as to its weight. For example, a refuse container full of paper products may weigh very little, whereas a refuse container only partially full of more dense refuse such as metal or liquid product may be very heavy. Thus, it is virtually impossible for a refuse collector to know what effort to apply to move or lift a particular refuse container. As a result, refuse collectors are prone to injury, particularly if they are surprised by the weight of a refuse container they attempt to move or lift.

Such injuries affect refuse collectors and their employers alike. Refuse collectors suffer pain, recoupment time, lost wages, and potentially shortened careers. Employers suffer lost workers, increased insurance costs, and inefficiencies by having to replace workers or ask current workers to work overtime. Of course, requesting that current workers work overtime makes those workers more prone to fatigue and injury, thereby spiraling the cycle Some jurisdictions responsible for waste management provide regulations concerning refuse. For example, such jurisdictions may provide that refuse containers not exceed 50 or 60 pounds per container. However, there is little chance of anyone filling a refuse container to have any idea of the weight of refuse already in the container or how much additional weight can be added to the container without violating a jurisdictional regulation.

BRIEF SUMMARY OF THE INVENTION

In an embodiment, a refuse container provides an indication of the weight contained therein as well as an alert to warn a refuse collector concerning the weight of refuse in the refuse container. The alert can also be viewed by a user of the refuse container so they are advised that the refuse container is full or nearly full and that no more refuse can be placed therein.

In an embodiment, the refuse container comprises a body in which refuse is held, one or more springs, a movable platform seated on top of the one or more springs, the platform able to move in the vertical direction; a weight indicator having at least one line of demarcation to provide weight indicator regions, the weight indicator being attached to the platform so that it moves with the platform.

In an embodiment, a refuse container comprises a body in which refuse is held; a platform in the body upon which refuse is placed; at least one spring that allows the platform to move up or down depending on a weight of refuse that is placed on the platform; a weight indicator attached to the platform, the weight indicator having a plurality of weight indicator regions, each weight indicator region indicative of the weight of the refuse placed in the refuse container, and consequently how safe it is to handle; and a window through which at least one of the plurality of weight indicator regions can be viewed to provide an indication to a viewer as to how safe the weight of refuse in the refuse container is to handle, as well as an indication as to whether additional refuse can be placed in the container.

In another embodiment, a method for calibrating the refuse container having a platform and a weight indicator attached to the platform comprises placing a calibration weight on the platform; and marking the weight indicator to distinguish a weight indicator region that indicates a weight greater than the known weight, and a weight indicator region that indicates a weight lower than the known weight. The calibration weight can be removed and the process can be repeated for additional calibration weights.

Additional features and embodiments of the present invention will be evident in view of the following detailed description of the invention.

BRIEF DESCRIPTION OF THE DRAWINGS

FIG. 1B illustrates an exemplary refuse container 102 having a mechanical alert mechanism according to another embodiment of the present invention.

FIG. 1C illustrates an exemplary refuse container 102 having a mechanical alert mechanism according to another embodiment of the present invention.

FIG. 3A illustrates a first state of a weight indicator when there is refuse in a refuse container according to an embodiment.

FIG. 3B illustrates a first state of a weight indicator when there is refuse in a refuse container according to an embodiment.

DETAILED DESCRIPTION

Figure 1:
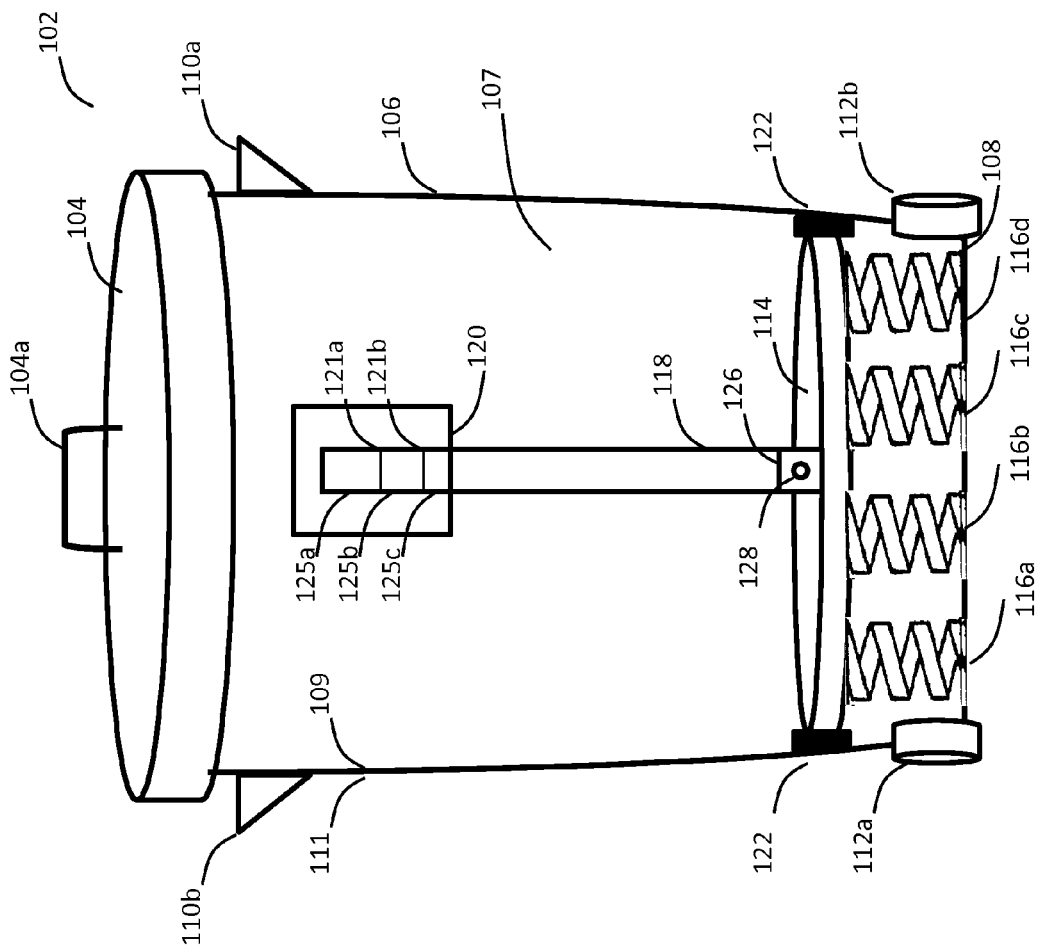
FIG. 1 illustrates an exemplary refuse container 102 having a mechanical alert mechanism according to an embodiment of the present invention.

FIG. 1 illustrates an exemplary refuse container 102 having a mechanical alert mechanism according to an embodiment of the present invention. In an embodiment, refuse container 102 includes a lid 104. In an embodiment, lid 104 includes a handle 104a. Lid 104 can be detachable or removable from body 106. Lid 104 can also be attached to body 106 via a hinge to allow the lid to be opened and closed.

Refuse container 102 also includes a body 106. Body 106 can be formed with one or more walls. The wall(s) forming body 106 have an inner surface 109 and an outer surface 111. Body 106 can be formed of any suitable material, including, without limitation rubber, metal, plastic, composite material, or combinations thereof. Body 106 encloses an inner volume 107. Refuse container 102 also includes a floor 108. In an embodiment, refuse container 102 includes one or more wheels 112a and 112b to facilitate movement of refuse container 102. In an embodiment, refuse container 102 includes one or more handles, for example, handles 110a and 110b. Handles 110a and 110b can be used for lifting or moving refuse container 102.

According to an embodiment, refuse container 102 includes a platform 114. Refuse can be placed directly on platform 114, or in a bag that is placed in refuse container 102, such as a garbage bag. In an embodiment, platform 114 is allowed to move in a vertical direction. Platform 114 can be of any suitable material including, by way of example, metal, wood, and/or plastic. Platform 114 is placed on top of one or more springs 116a, 116b, 116, and 116d. Six springs 116a-d are shown as an exemplary embodiment. Fewer or more than four springs can be used in a particular embodiment. In an embodiment, springs 116a-d are compression springs.

A weigh indicator 118 is attached to platform 114 such that it moves vertically with platform 114. Weight indicator 118 has one or more weight indicator regions separated by one or more separators that provide information as to the weight of the refuse in refuse container 102. The regions can include any markings to provide information as to the weight of the refuse in refuse container 102. Such markings include words, colors, numbers, or any other markings to distinguish the regions. The separators can be any separator to provide for distinguishing between regions. For example, in an embodiment, weight indicator 118 includes two lines 121a and 121b as separators. The separators separate a portion of weight indicator 118 into two or more distinct weight indicator regions. For example, line separators 121a and 121b create three distinct weight indicator regions 125a, 125b, and 125c.

In an embodiment, to better distinguish the weight indicator regions, the weight indicator regions are color-coded. For example, in an embodiment, weight indicator region 125a is color-coded red to indicate a weight of refuse in refuse container 102 that is dangerous to handle; weight indicator region 125b is color-coded yellow to indicate a weight that while not dangerous to handle, is sufficiently heavy that caution should be exercised when handling it; and weight indicator regions 125c is color-coded green to indicate that the weight of refuse in refuse container 102 is safe to handle. In another embodiment, weight indicator region 125a is marked with the words "DANGER—EXTREMELY HEAVY"; weight indicator region 125b is marked with the words "HEAVY—USE CAUTION"; and weight indicator region 125c is marked with the words "SAFE WEIGHT". In another embodiment, weight indicator region 125a is marked with the words "GREATER THAN 50 LBS"; weight indicator region 125b is marked with the words "BETWEEN 25 AND 50 LBS"; and weight indicator region 125c is marked with the words "LESS THAN 25 LBS". In yet another embodiment, weight indicator region 125a is marked with the words "FULL—DO NOT ADD MORE" to indicate that refuse container is holding the maximum amount of refuse and cannot hold more; weight indicator region 125b is marked with the words "NEARLY FULL—ADD WITH CAUTION" to indicate to a user that the refuse container is nearly full and to be careful how much additional refuse is added; and weight indicator region 125c is marked with the word "OKAY" to indicate the refuse container is empty, nearly empty, or otherwise in a state where adding refuse is not problematic. In general, any markings or combinations of marking (such as colors and/or words) that distinguish the weight indicator regions can be used. Any number of separators can be used that will provide a plurality of distinguishable weight indicator regions.

Figure 2:
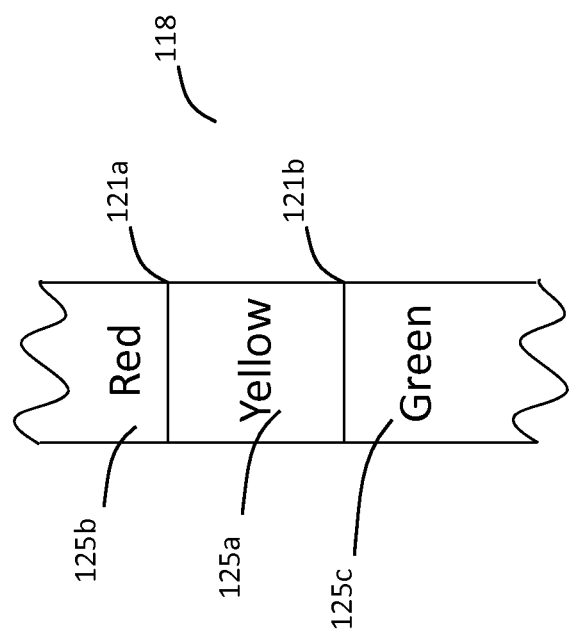
FIG. 2 illustrates a portion of weight indicator 118 that shows two separators that provide three weight indicator regions.

FIG. 2 illustrates a portion of weight indicator 118 that shows separators 121a and 121b that provide three weight indicator regions 125a, 125b, and 125c. In the exemplary embodiment illustrated in FIG. 2, weight indicator regions 125a, 125b, and 125c are color coded to better distinguish them as described above. In an embodiment, marking do not have to cover the entire weight indicator region 125a, 125b, or 125c.

In an embodiment, weight indicator 118 is mounted on platform 114 to allow for calibration. There are a number of ways for weight indicator 118 to be mounted on platform 114 to facilitate calibration. In a first manner, weight indicator 118 is attached to platform 114 in a fixed manner, as shown, for example, in FIG. 1B. Any fixed way of attaching weight indicator to platform 114 can be used including nails, screws, and/or glue. In an embodiment, platform 114 and weight indicatory 118 are formed from a unitary body, as shown for example, in FIG. 1C.

In another embodiment, weight indicator 118 is slidably attached to platform 114 through an apparatus that, in an open state, allows weight indicator 114 to slide up and down, and in a closed state, firmly holds weight indicator 114 in place. Such an apparatus can be a clamp such as clamp 126 that when open allows weight indicator 118 to slide up or down, and when closed, does not allow weight indicator 118 to slide up and down. Clamp 126 can be closed in any number of ways, including for example, tightening a screw 128 that closes clamp 126.

In an embodiment, refuse container 102 includes a window 120 through which at least a portion of a weight indicator region 125a, 125b, or 125c can be seen. In an embodiment, window 120 is simply an opening in refuse container 102. In another embodiment, window 120 is formed by inserting a transparent or semi-transparent acrylic panel (such as plexi-glass) or other suitable material (including, e.g., glass) in an opening in refuse container 102. Using a panel helps to protect the interior of refuse container 102 from the elements.

In an embodiment, a seal 122 is formed around platform 114. Seal 122 helps to prevent moisture, debris, or other contaminants from detrimentally affecting the operation of springs 116a-d, which could lead to reduced spring lifetime, and unpredictable performance. In an embodiment, seal 122 is made of rubber or other flexible material. In an embodiment, seal 122 is treated to make it weather-resistant or weather-proof.

In operation when refuse is placed on platform 114 in refuse container 102, the weight of the refuse causes spring or springs 116a-d to compress, and consequently platform 114 to move down. As the platform moves down, one or more of weight indicator regions 125a, 125b, and 125c will be visible in window 120. Which weight indicator region 125a, 125b, or 125c is visible provides an indication of the weight of the refuse in refuse container 102.

For example, in an embodiment using color-coding of three weight indicator regions as described above, if the green is visible in window 120, this would indicate a safe weight to handle or that additional refuse can be added; if the yellow region is visible, and the green region is not visible, this would indicate that the weight of refuse in refuse container 102 is sufficiently heavy that caution should be exercised or care used when adding additional refuse, but not so heavy as to indicate a dangerous weight or to indicate that additional refuse cannot be added; and if the red were visible and the yellow not visible, this would indicate a dangerous or excessively heavy weight of refuse in refuse container 102 or that no more refuse should be added. Actual operation can vary based on implementation. For example, again considering an embodiment with color coding with no weight, refuse container 102 can be configured such that only a portion green weight indicator region 125c is seen through window 120, or configured such that no green is seen through window 120 until some weight is put in refuse container 102. The operation will be similar and other embodiments using other indicators of the weight in refuse container 102, such as words, phrases, colors, combinations of these, or any other indicia of weight in refuse container 102 that can be placed on weight indicator 118.

By way of example, FIGS. 3A and 3B demonstrate an exemplary embodiment of the above-described operation. FIG. 3A illustrates a first state of a weight indicator when there is refuse in a refuse container according to an embodiment. In FIG. 3A, because the green weight indicator region 125c is at least partially visible, a refuse collector would know that the weight in refuse container 102 is safe to handle. Similarly a user of refuse container 102 would know that additional refuse can be added to refuse container 102 without fear. FIG. 3B illustrates a second state of a weight indicator when there is refuse in a refuse container according to an embodiment. In FIG. 3B, because yellow weight indicator region 125b is at least partially visible, and green weight indicator region 125c is not visible, a refuse collector would know that refuse container 102 requires extra care in handling due to the weight of refuse in refuse container 102. Similarly, a user of refuse container 102 would know to use care in adding additional refuse to be sure not to exceed the maximum. Thus, embodiments provide a refuse collector who can view one or more of the weight indicator regions through window 118 with an indication of how safe the weight in refuse container 102 is to handle or whether additional precaution and measures must be taken to handle the refuse in refuse container 102, and for users, whether additional refuse can be added into refuse container 102.

In an embodiment, to address uneven loading of springs 116a-d, springs are chosen with spring constants (i.e., stiffness) that resists small weight, and is more responsive to heavier weights.

In an embodiment, prior to placement in refuse container 102, refuse container 114 is calibrated. In an embodiment, calibration is performed using standard, or otherwise known, calibration weights that are placed on platform 114. Calibration can be performed by a manufacturer or a user of refuse container 102.

In an embodiment, calibration proceeds as follows. Weight indicator 118 is mounted as described above. A separation line (or other marking) is marked on weight indicator 118 to coincide with the bottom, middle, top or other portion of the window 120 when there is no weight on platform 114. Thereafter, a first calibration weight to be calibrated is placed on platform 114. A separation line (or other marking) is then marked on weight indicator 118 to coincide with the bottom, middle, top or other portion of the window 120 when the first calibration weight to be calibrated is on platform 114. The first calibration weight is removed. This process of placing a calibration weight on platform 114, marking weight indicator 118, and removing the weight is repeated for any additional calibration weights to use to calibrate refuse container 102.

The weight indicator region of weight indicator 118 between any two markings made during calibration on weight indicator 118 indicates that the weight in refuse container 118 is greater than or equal to the lower marking (when weight indicator 118 is mounted as described above), but less than or equal to the higher marking (when weight indicator 118 is mounted as described above). Thus, which weight indicator region or regions are visible through window 120 provides an indication of the weight of the refuse in refuse container 102 and therefore how safe it is to handle or whether additional refuse can be added.

In an embodiment, no calibration is performed when there is no weight in the container. Instead, calibration is performed only for desired calibration weights to be calibrated. In such embodiment, the portion of weight indicator 118 below the separation line (or other marking) marked for the lightest calibration weight used to calibrate refuse container 102 corresponds to a weight indicator region that indicates that the weight of the refuse in refuse container 102 is less than the first weigh calibrated.

After calibration, weight indicator 118 can be further marked to better distinguish weight indicator regions. For example, where there are two lines of separation resulting in three weight indicator regions, the regions may be color-coded as described above to provide indications as to the weight of the refuse in refuse container 102, and consequently the danger level that may be consequent with handling it, or whether additional refuse may be added by a user.

Marking to distinguish weight indicator regions may be done in any manner that will be substantially permanent. For example, in the case of color coding, paint, colored tape, or stickers can be used to mark the weight indicator regions with the color appropriate for the region. Words can be placed in the appropriate weight indicator region using, for example, marker pens and tape or stickers, with words written on them. Any other method of marking can be used in an implementation as appropriate to distinguish the weight indicator regions.

Additional methods of calibration are possible in alternate embodiments. In an embodiment, weight indicator 118 pre-marked with weight indicator regions. A calibration weight is then placed on platform 114, and weight indicator 118 is moved vertically until the appropriate region corresponding to the calibration weight is visible through window 120. Screw 128 is then tightened to secure weight indicator 118. In another embodiment, embodiment weight indicator 118 is pre-marked with weight indicator regions and then fixedly attached to platform 114. A calibration weight is placed on platform 114 and one or more of springs 116a-d is adjusted by changing its compression ratio such that the weight indicator regions corresponding to the calibration weight is visible in window 120. In another embodiment, calibration counterweights are permanently placed on platform 114 to cause the appropriate pre-marked weight indicator regions to appear in window 120 when a calibration weight is placed on platform 114.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A refuse container, comprising:
   a body in which refuse is held;

a platform in the body upon which refuse is placed;

at least one spring that allows the platform to move up or down depending on a weight of refuse that is placed on the platform;

a seal surrounding the platform;

a weight indicator attached to the platform, the weight indicator having a plurality of weight indicator regions, each weight indicator region indicative of the weight of the refuse placed in the refuse container; and a window through which at least one of the plurality of weight indicator regions can be viewed to provide an indication to a viewer of the weight in the refuse container.

2. The refuse container of claim 1, further comprising a panel for the window.

3. The refuse container of claim 1, wherein at least one of the plurality weight indicator regions is color coded.

4. The refuse container of claim 1, wherein at least one of the plurality of weight indicator regions is distinguished using text.

5. The refuse container of claim 1, further comprising a plurality of springs.

6. The refuse container of claim 1, wherein the weight indicator is slidably mounted to the platform to allow for calibration.

7. The refuse container of claim 4, wherein the text indicates one or more actual weight ranges.

8. The refuse container of claim 4, wherein the text indicates how full the refuse container is.

9. The refuse container of claim 4, wherein the text warns of danger of lifting the refuse container.

10. The refuse container of claim 1, wherein the weight indicator is fixedly attached to the platform.

11. The refuse container of claim 1, wherein the weight indicator is slidably attached to the platform.

12. The refuse container of claim 1, wherein the weight indicator and the platform are formed from a unitary body.

* * * * *